United States Patent [19]

Quermann

[11] Patent Number: 4,838,099
[45] Date of Patent: Jun. 13, 1989

[54] GYROCOMPASS

[75] Inventor: Thomas R. Quermann, Huntington Station, N.Y.

[73] Assignee: Unisys Corporation, Blue Bell, Pa.

[21] Appl. No.: 66,282

[22] Filed: Jun. 25, 1987

[51] Int. Cl.$^4$ .................... G01C 19/28; G01C 19/48
[52] U.S. Cl. ................................ 74/5.47; 74/5.6 D; 74/5.9
[58] Field of Search ............... 74/5.6 D, 5.7, 5.9, 74/5 R, 5.12, 5.47; 33/324

[56] References Cited

U.S. PATENT DOCUMENTS

| | | | |
|---|---|---|---|
| 2,734,384 | 2/1956 | Stewart | 74/5 R X |
| 3,263,507 | 8/1966 | Appleton | 74/5 R X |
| 3,677,097 | 7/1972 | Quermann | 74/5 R |
| 4,703,654 | 11/1987 | Ficken et al. | 73/504 |

Primary Examiner—Rodney H. Bonck
Attorney, Agent, or Firm—Albert B. Cooper; Seymour Levine

[57] ABSTRACT

A gyroscope employing a rotor in rolling contact with a ball positioned at the end of a drive shaft, the arrangement establishing a loose fitting ball and socket suspension for the rotor. Contact points of the rotor on the ball establishes the necessary pendulousities with the rotor center of gravity for damped gyrocompassing.

11 Claims, 2 Drawing Sheets

GYROCOMPASS

BACKGROUND OF THE INVENTION

1. Field of the Invention

The invention pertains to gyroscopic devices particularly of the type suitable for use as gyrocompasses.

2. Description of the Prior Art

There is a need for a gyrocompass that may be manufactured at a relatively low cost. A gyroscope that is a candidate for use in such a gyrocompass is the flex suspended free rotor gyro. In these gyroscopes, the rotor is radially supported on the spin axis, and about axes perpendicular to the spin axis, by a flexure support. These flexure supports have spring centering gradient characteristics which are mutually compensated, thereby providing an anisoelastic gyro suspension and compensation for undesirable restraining torques. Though flex gyros are inexpensive, their cost advantage is offset in gyrocompasses by the cost of required auxiliary equipment. This auxiliary equipment includes two servo driven gimbals to keep the gyro pick-offs nulled, a vertical reference and control loop for levelling the spin axis, and a vertical reference to ordinate the torquing axis with respect to gravity.

It is an object of this invention to minimize the total cost by eliminating the flexure suspension elements, separate vertical reference and leveling loop, and vertical reference for torquing elements.

SUMMARY OF THE INVENTION

In accordance with the present invention, a gyroscope for use as a gyrocompass utilizes a ball at the end of the drive shaft which is used in a loose fitting ball and socket suspension for the gyroscope rotor. The rotor is in rolling contact with the driven ball, the contact point of the ball on the rotor being at a position, with respect to the center of gravity of the rotor, that establishes the required horizontal and vertical pendulosities for damped gyrocompassing. A speed servo on the drive shaft reduces intercardinal roll errors by accelerating or decelerating the rotor in response to lateral displacement of the rotor with respect to the gyrocompass case. A dither of the vertical axis pick-off is used to average frictional torques caused by the finite area of contact between the ball and the rotor.

DESCRIPTION OF THE PREFERRED EMBODIMENTS

Figure 1:
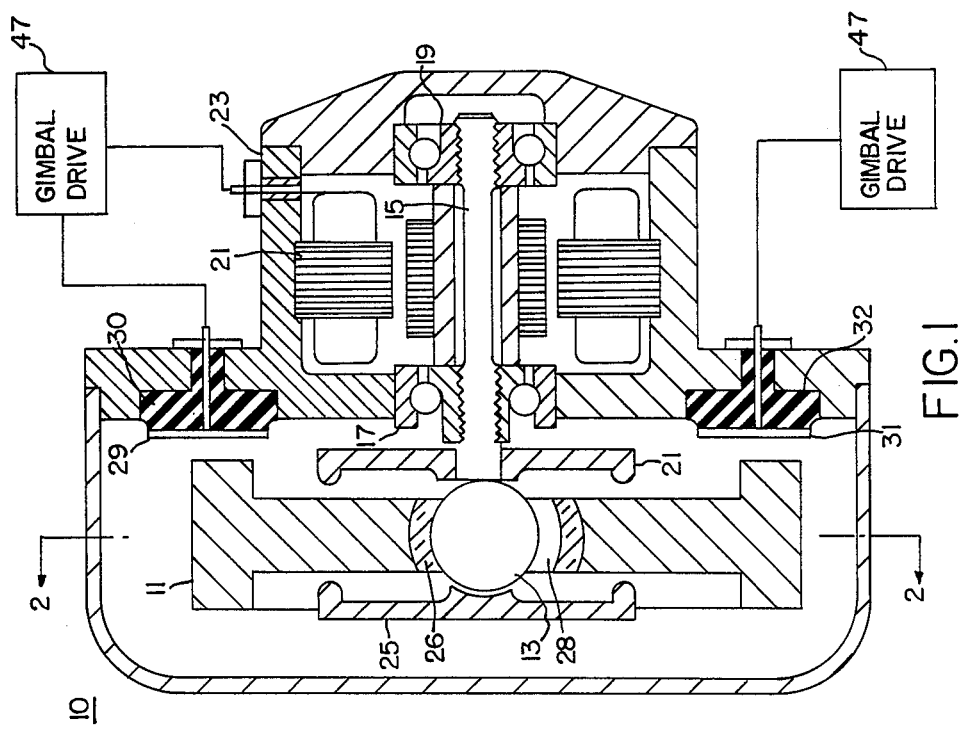
FIG. 1 is a cross-sectional view of a preferred embodiment of the invention.

Referring now to FIG. 1, a gyroscope 10 is shown having a rotor 11 in rolling contact with a ball 13 attached to a shaft 15 which is supported by ball bearings 17, 19 and driven by a synchronous motor 21 mounted in a housing 23. Rotor 11 and ball 13 are constructed and arranged to form a loose fitting ball and socket suspension. The rotor 11, being in rolling contact with the ball 13, acquires a contact position on the ball 13, relative to the center of gravity of the rotor 11, to establish horizontal and vertical axis pendulousities for damped gyrocompassing. Stops 25, 27, attached to the shaft 15, limit the displacement of the rotor 11 and prevent its disengagement from the ball 13. Pick-off plates, adjacent to the lateral surface of the rotor 11 and positioned at 90 degree intervals, two of which 29, 31 are shown in FIG. 1, mounted on the housing 23 with insulating material 30 and 32 therebetween, may be utilized to detect the plane of rotation of the rotor 11 with respect to the housing 23. These pick-off plates create capacitors which the rotor 11 that may be coupled to a capacitive bridge to supply error signals to the gimbal drive 47. As represented in FIG. 1, capacitance differences between the capacitors formed by the rotor 11 and pick-off plates 29 and 31 are functions of the tilt angle of the rotor.

Gravitational forces tend to maintain the rotor 11 in contact with the ball 13. To provide a more positive contact the ball 13 may be. magnetized or a circular permanent magnet 26 may be positioned along the periphery of the central bore 28 in the rotor 11.

Figure 2:
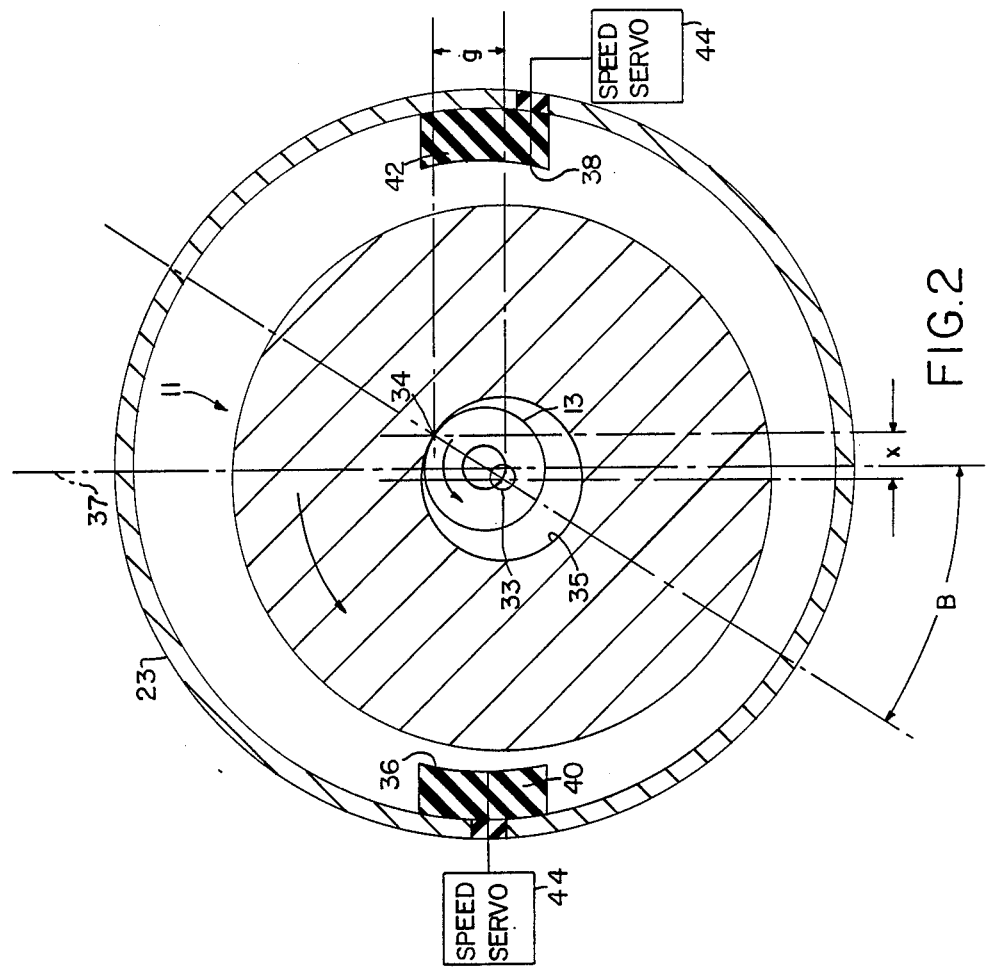
FIG. 2 is a cross-sectional view through the section A-A in FIG. 1.

Referring now to FIG. 2, wherein a transverse section in the plane A—A indicated in FIG. 1 of the gyrocompass is shown. As the rotor 11 rotates, a drag torque created by the atmosphere established in the gyroscope and the hysteresis losses established by the finite deformations at the contact between the ball 13 and the rotor 11 cause the center of gravity 33 of the rotor, which is offset from the axis of rotation of the shaft due to the differences in diameter between the ball 13 and the contacting surface 35 of the rotor 11, to have an angular offset B from the vertical axis 37, thereby creating a vertical axis pendulous moment arm "x" between the contact point 34 and the center of gravity 33. The offset distance between the contact point 34 and the center of gravity 33 also establishes a horizontal axis pendulous moment arm "y". For clarity of presentation, the offset angle B and the pendulous moment arm "x", "y" are greatly exaggerated.

Since the contact between the ball 13 and the inner surface 35 is over a finite area and not at a point, a vertical axis torque uncertainty exists. To minimize this uncertainty, a dithering of the vertical axis pick-off null may be utilized to average the frictional torques to an acceptable value. Dithering with an amplitude of one minute of arc would contribute an insignificant error to any direct reading application and, if necessary, an error signal generated by such dithering may easily be subtracted from the gyroscope transmitted signals.

Diametrically positioned pick-off plates 36 and 38, adjacent to the circumferential surface of the rotor 11, mounted on the housing with insulation material 40 and 42 between the pick-off plates 36,38 and the housing, form capacitors with the rotor 11. The capacitive difference between these capacitors is a function of the lateral position of the rotor 11 with respect to the housing 23. This difference is detected by the capacitive bridge in the speed servo 44, to establish a component of the speed control signal representative of the lateral displacement.

Figure 3:
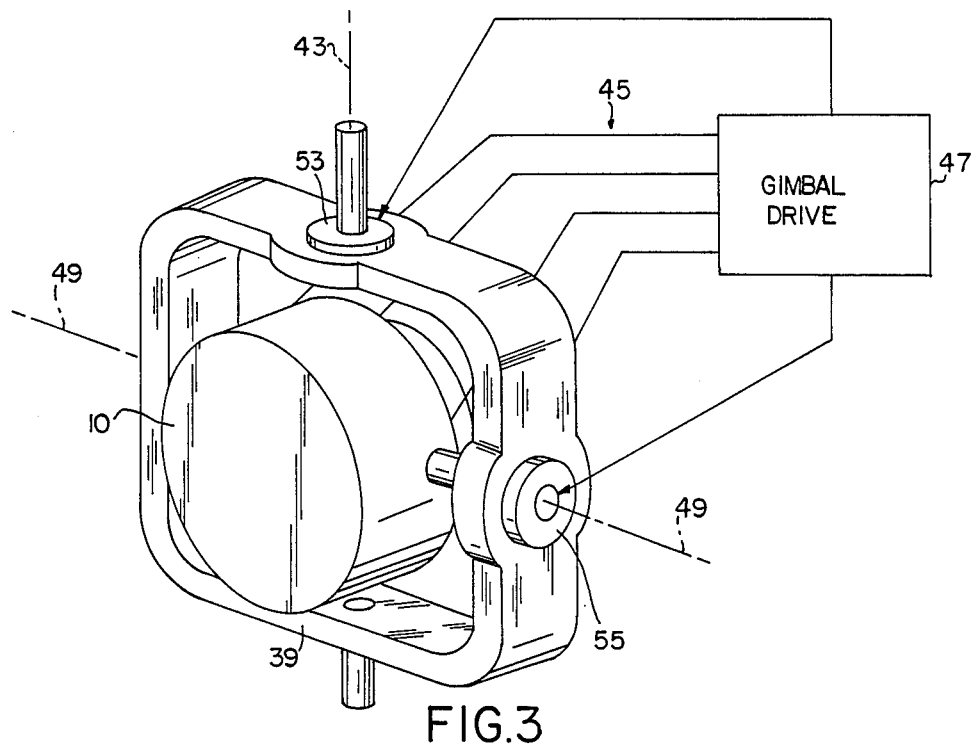
FIG. 3 is an illustration of a gimbal support for the embodiment of FIG. 1.

A gimbal structure for mounting the gyroscope is shown in FIG. 3. The gyroscope 10 may be mounted in gimbal 39 for rotation about a horizontal axis 41, while the gimbal 39 bay be pivotally mounted to the case of a gyrocompass (not shown) for rotation about the vertical axis 43. Pick-off plates 29, 31, 34, and 36 may be coupled via lines 45 to a gimbal drive 47 wherein signals are generated for controlling servomotors 53 and 55 which position the gimbal 39 and gyroscope 10.

Figure 4:
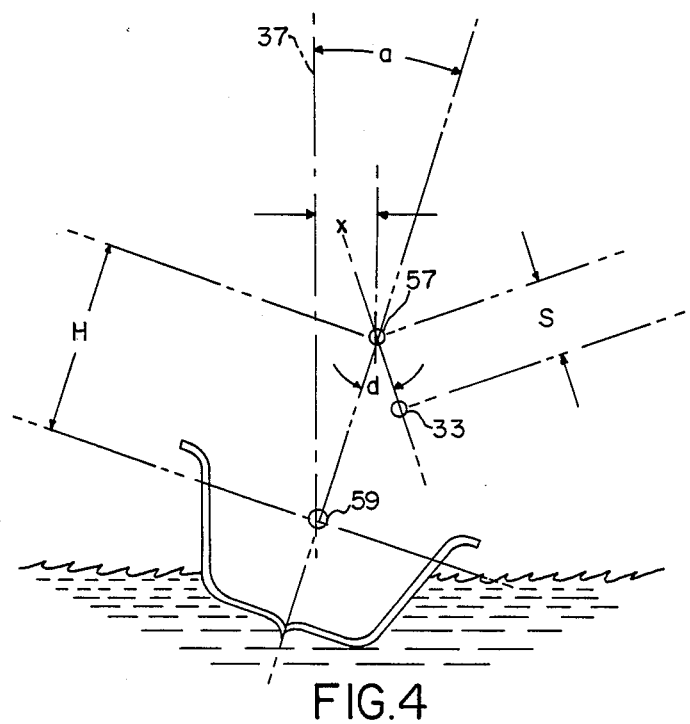
FIG. 4 is a schematic diagram showing the relationship of the gyrocompass to a ship in a roll position.

In FIG. 4, a schematic section of a ship with a gyrocompass mounted thereon is shown. n the figure, the spin axis 57 is displayed parallel to and a height H above the ship's roll axis 59. Displaying the spin axis 57 as parallel to the roll axis 59 is only for illustration, since the compensation system is intended to minimize the displacement caused by the component of the roll that is parallel to the spin axis. If the pendulum formed by the displacement of the center of gravity 33 is not displaced from the vertical by the roll component parallel to the spin axis, no vertical axis torque will be produced by accelerations induced by the component of roll perpendicular to the spin axis.

Generally, the ship's roll creates only small angles and since the displacement S of the center of gravity 33 from the spin axis 57 is very much less than the height H of the spin axis 57 above the roll axis of the ship, an oscillatory motion about the vertical axis 37 may be given by $a = A \sin Qt$, where Q is the roll frequency. Those skilled in the art will recognize that this motion establishes a lateral acceleration L for the spin axis 57 that is equal to $-HAQ^2 \sin Qt$, thereby establishing a torque T on the pendulum of $-MLS$, where M is the mass of the rotor 11. An equal and opposite torque applied to the rotor 11 by the spin motor 21 prevents the pendulum from being displaced. This equal and opposite torque causes an acceleration $\dot{w} = T/I$, where I is the inertia of the rotor and w is the spin speed. When the compensation is correct, the displacement d of the rotor 11 will equal the ship roll angle a. To accomplish this, the required acceleration of the rotor 11 is given by $\dot{w} = (MSHQ^2 d)/I$. In this equation, M,S, and I are gyroscope constants, H and Q are ships constants, and d is measured by the lateral pick-off plates 36 and 38.

The speed servo 44 must produce a rate of change of speed that is proportional to the displacement signal generated by the capacitive bridge unbalance caused by the capacitors formed between the rotor 11 and the pickoff plates 36,38. This servo should include a high pass filter to permit speed servo responses only to alternating signals caused by a swinging rotor and to prevent speed servo responses to near constant signals generated by a the vertical axis pendulous displacement.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A gyroscope comprising:
   a housing;
   a rotor within said housing having a central aperture with a predetermined diameter and a circumferential outer surface for said aperture;
   a drive shaft having a spherical end section, of diameter less than said predetermined diameter, positioned in rolling contact with said outer surface;
   means for detecting orientations of said rotor with repect to said housing; and
   means coupled to said detecting means for rotating said drive shaft.

2. The gyroscope of claim 1 further including means in said housing for establishing drag torque on said rotor.

3. The gyroscope of claim 1 further including means coupled to said drive shaft for limiting displacements of said rotor.

4. The gyroscope of claim 1 wherein said detecting means includes a plurality of metallic plates insulatedly mounted on said housing adjacent said rotor, each forming a variable capacitor with said rotor.

5. The gyroscope of claim 4 wherein said detecting means further includes means coupled between said metallic plates and said rotating means for providing signals to said rotating means in a manner to rotate said drive shaft at a rate corresponding to said signals.

6. The gyroscope of claim 4 wherein said plurality of metallic plates comprise first and second groups, each group adjacent to a different surface of said rotor.

7. The gyroscope of claim 6 wherein said first group is four in number circularly positioned at 90 degree intervals and said second group is two in number diametrically positioned.

8. The gyroscope of claim 4 further including:
   first turning means coupled to said housing for turning said gyroscope about a first axis;
   gimbal means for mounting said first turning means;
   second turning means coupled to said gimbal means for rotating said gimbal means about a second axis; and
   means coupled to said first and second turning means and said plurality of metallic plates for providing drive signals to said first and second turning means.

9. A gyroscope comprising:
   a housing;
   a rotor within said housing having a central aperture with a predetermined diameter and circumferential outer surface for said aperture;
   a drive shaft having a spherical end section, of diameter less than said predetermined diameter, positioned in rolling contact with said outer surface;
   a plurality of metallic plates insulatedly mounted on said housing adjacent said rotor, each forming a variable capacitor with said rotor;
   means for rotating said drive shaft; and
   means coupled between said metallic plates and said rotating means for providing signals to said rotating means in a manner to rotate said drive shaft at a rate corresponding to said signals.

10. The gyroscope of claim 9 wherein said plurality of metallic plates are four in number and circularly positioned at 90 degree intervals.

11. The gyroscope of claim 9 further including:
    first turning means coupled to said housing for rotating said gyroscope about a first axis;
    gimbal means for mounting said first rotating means;
    second turning means coupled to said gimbal means for rotating said gimbal means about a second axis; and
    means coupled to said first and second turning means and said plurality of metallic plates for providing drive signals to said first and second turning means.

* * * * *